(12) United States Patent
Chen et al.

(10) Patent No.: US 10,461,331 B2
(45) Date of Patent: Oct. 29, 2019

(54) LITHIUM BATTERY

(71) Applicant: NATIONAL CHENG KUNG UNIVERSITY, Tainan (TW)

(72) Inventors: Yen-Ming Chen, Tainan (TW); Te-Fu Yeh, Tainan (TW); Shih-Ting Hsu, Tainan (TW); Hsisheng Teng, Tainan (TW); Sheng-Shu Hou, Tainan (TW); Jeng-Shiung Jan, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 99 days.

(21) Appl. No.: 15/826,729

(22) Filed: Nov. 30, 2017

(65) Prior Publication Data

US 2019/0088946 A1     Mar. 21, 2019

(30) Foreign Application Priority Data

Sep. 20, 2017  (TW) .............................. 106132306 A

(51) Int. Cl.
| | |
|---|---|
| *H01M 4/583* | (2010.01) |
| *H01M 2/02* | (2006.01) |
| *H01M 10/0565* | (2010.01) |
| *H01M 10/052* | (2010.01) |
| *H01M 2/16* | (2006.01) |
| *H01M 4/62* | (2006.01) |
| *H01M 10/0567* | (2010.01) |

(52) U.S. Cl.
CPC ............. *H01M 4/583* (2013.01); *H01M 2/02* (2013.01); *H01M 2/16* (2013.01); *H01M 4/62* (2013.01); *H01M 10/052* (2013.01); *H01M 10/0565* (2013.01); *H01M 10/0567* (2013.01); *H01M 2300/0025* (2013.01); *H01M 2300/0085* (2013.01)

(58) Field of Classification Search
None
See application file for complete search history.

(56) References Cited

U.S. PATENT DOCUMENTS

| | | |
|---|---|---|
| 2016/0228846 A1 | 8/2016 | Chen et al. |
| 2017/0269096 A1* | 9/2017 | Huang .................. G01N 33/50 |
| 2018/0186645 A1 | 7/2018 | Xu |

FOREIGN PATENT DOCUMENTS

| | | |
|---|---|---|
| CN | 103396573 A | 11/2013 |
| CN | 103738941 A | 4/2014 |
| WO | 2017000731 A1 | 1/2017 |

* cited by examiner

*Primary Examiner* — Sarah A. Slifka
(74) *Attorney, Agent, or Firm* — Soroker Agmon Nordman

(57) ABSTRACT

A lithium battery is provided and has a plurality of graphene oxide quantum dots, where the graphene oxide quantum dots have an average particle size between 2 nm and 9 nm. The graphene oxide quantum dots can improve electrical properties of the lithium battery.

5 Claims, 5 Drawing Sheets

LITHIUM BATTERY

CROSS REFERENCE TO RELATED APPLICATION

This application claims priority to Taiwan Patent Application No. 106132306, filed on Sep. 20, 2017, which is incorporated herein by reference in its entirety.

FIELD OF THE DISCLOSURE

The present disclosure relates to a battery, and more particularly to a lithium battery.

BACKGROUND OF THE DISCLOSURE

In recent years, lithium batteries have been widely used in a variety of electronic products, electric vehicles, or energy storage devices. Therefore, many studies focus on improving performance, energy density, and security of lithium batteries.

However, there is still room for improvement in electrical properties of conventional lithium batteries. Therefore, it is necessary to provide a lithium battery to further improve the conventional lithium batteries.

SUMMARY OF THE DISCLOSURE

An object of the present disclosure is to provide a lithium battery including a plurality of graphene oxide quantum dots with a specific average particle size range to improve the electrical properties of the lithium battery.

To achieve the above object, the present disclosure provides a lithium battery including a plurality of graphene oxide quantum dots, wherein the graphene oxide quantum dots have an average particle size between 2 nm and 9 nm.

In one embodiment of the present disclosure, the lithium battery further includes a hollow housing; an anode disposed in the hollow housing; and a cathode disposed in the hollow housing.

In one embodiment of the present disclosure, the anode includes the graphene oxide quantum dots.

In one embodiment of the present disclosure, the cathode includes the graphene oxide quantum dots.

In one embodiment of the present disclosure, the lithium battery further includes a separator disposed between the anode and the cathode; and a liquid electrolyte filled between the anode and the separator and filled between the cathode and the separator, wherein the liquid electrolyte includes a lithium ions composition.

In one embodiment of the present disclosure, the liquid electrolyte includes the graphene oxide quantum dots.

In one embodiment of the present disclosure, the separator includes the graphene oxide quantum dots.

In one embodiment of the present disclosure, the lithium battery further includes a gel-state electrolyte disposed between the anode and cathode.

In one embodiment of the present disclosure, the gel-state electrolyte includes the graphene oxide quantum dots.

In one embodiment of the present disclosure, the gel-state electrolyte includes: 85 to 95 parts by weight of poly (acrylonitrile-co-vinyl acetate); 7.5 to 12.5 parts by weight of poly(methyl methacrylate); 0.05 to 1 part by weight of the graphene oxide quantum dots; and 20 to 70 parts by weight of a liquid electrolyte, wherein the liquid electrolyte includes a lithium ion composition.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

It is noted that, the present disclosure is to add a plurality of graphene oxide quantum dots into a lithium battery to improve electrical properties of the lithium battery. Specifically, a lithium battery generally has a cathode formed of such as $LiCoO_2$, an anode formed of such as graphite, and a separator disposed between the anode and the cathode, so that cations (such as $Li^+$) in the electrolyte can move from a place neighboring the anode to the cathode when the battery is discharged. However, in order to increase charge rate and/or discharge rate, one method enables anions ($PF_6^-$) in the electrolyte without moving or to decrease movement. In one embodiment of the present disclosure, electrical properties of the lithium battery are increased by adding the oxide graphene quantum dots so that the anions ($PF_6^-$) in the electrolyte do not move or decrease movement.

Figure 1A:
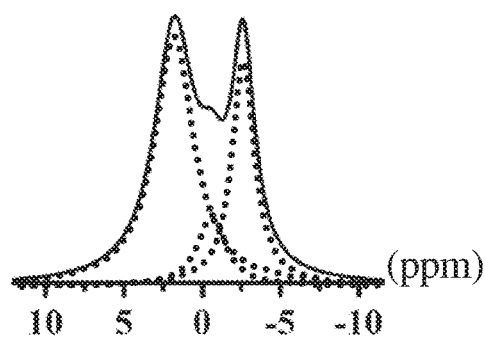
FIG. 1A is an experimental data diagram illustrating chemical shift of lithium ions in a liquid electrolyte.
Figure 1B:
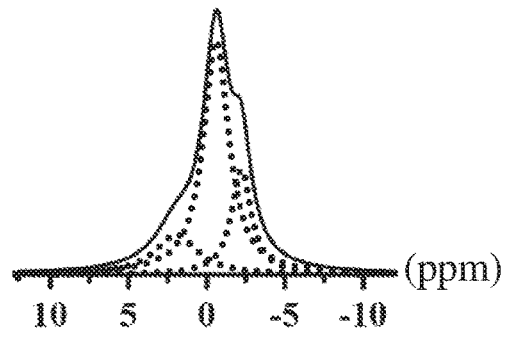
FIG. 1B is an experimental data diagram illustrating chemical shift of lithium ions in a gel-state electrolyte, where graphene oxide quantum dots are not added into the gel-state electrolyte.
Figure 1C:
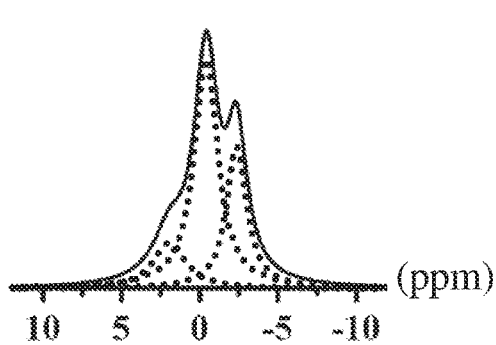
FIG. 1C is an experimental data diagram illustrating chemical shift of lithium ions in a gel-state electrolyte, where graphene oxide quantum dots (average particle size is 11 nm) are added into the gel-state electrolyte.
Figure 1D:
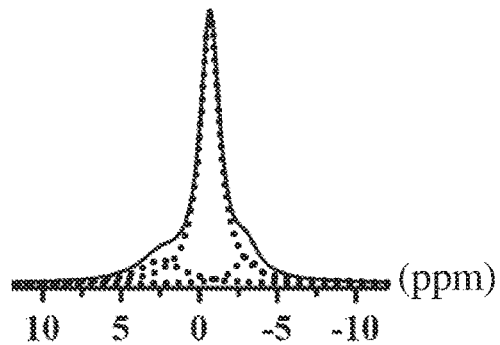
FIG. 1D is an experimental data diagram illustrating chemical shift of lithium ions in a gel-state electrolyte, where graphene oxide quantum dots (average particle size is 7 nm) are added into the gel-state electrolyte.
Figure 1E:
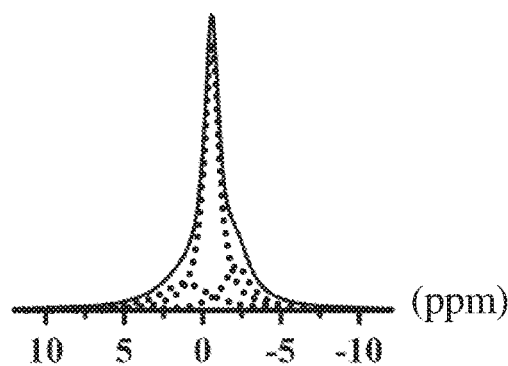
FIG. 1E is an experimental data diagram illustrating chemical shift of lithium ions in a gel-state electrolyte, where graphene oxide quantum dots (average particle size is 3 nm) are added into the gel-state electrolyte.

Referring to FIGS. 1A to 1E, FIG. 1A is an experimental data diagram illustrating chemical shift of lithium ions in a liquid electrolyte; FIG. 1B is an experimental data diagram illustrating chemical shift of lithium ions in a gel-state electrolyte, where graphene oxide quantum dots are not added into the gel-state electrolyte; FIG. 1C is an experimental data diagram illustrating chemical shift of lithium ions in a gel-state electrolyte, where graphene oxide quantum dots (average particle size is 11 nm) are added into the gel-state electrolyte; FIG. 1D is an experimental data diagram illustrating chemical shift of lithium ions in a gel-state electrolyte, where graphene oxide quantum dots (average particle size is 7 nm) are added into the gel-state electrolyte; and FIG. 1E is an experimental data diagram illustrating chemical shift of lithium ions in a gel-state electrolyte, where graphene oxide quantum dots (average particle size is 3 nm) are added into the gel-state electrolyte. In general, the term of "chemical shift" means different degrees of shielding effect of protons in the organic molecules, and therefore phenomena of different absorption peak position in a nuclear magnetic resonance spectrum is induced. In practical applications, the position of the absorption peak position is usually set to 0 ppm using tetramethyl silane ($(CH_3)_4Si$) as a reference. Therefore, results of materials to be measured may be positive or negative.

Further, when the measured result has a relatively high position at 0 ppm, it indicates that the cluster of the cations and the anions in the electrolyte is relatively few. Usually in this condition, it means that the anions in the electrolyte ($PF_6^-$) do not move or decrease movement. Therefore, based on FIGS. 1A to 1E, compared with the liquid electrolyte, the gel-state electrolyte has a better improvement on the cluster condition. Further, compared with the gel-state electrolyte without adding the graphene oxide quantum dots thereinto, the gel-state electrolyte having the graphene oxide quantum dots (such as the average particle size is 3 nm or 7 nm) has a further improvement on the cluster condition. From the above, the addition of these oxidized graphene quantum dots to the lithium battery can have an effect of improving the electrical properties of the lithium battery. It is worth mentioning that, in the subsequent examples, it only describes the addition of these oxidized graphene quantum dots to the gel-state electrolyte, but in fact, to add the oxide graphene quantum dots into other parts of the lithium battery (such as an anode, a cathode, a liquid electrolyte, or a separator) also have the same or similar effects.

In one embodiment of the present disclosure, a lithium battery 20 is provided and includes a plurality of graphene oxide quantum dots (GOQDs) 26, wherein the GOQDs 26 have an average particle size between 2 nm and 9 nm. In some embodiments, the average particle size of the GOQDs 26 can be 3 nm, 4 nm, 5 nm, 6 nm, 7 nm, or 8 nm. When the average particle size of the GOQDs is relatively small, an improvement in the electrical properties is relatively good.

Figure 2:
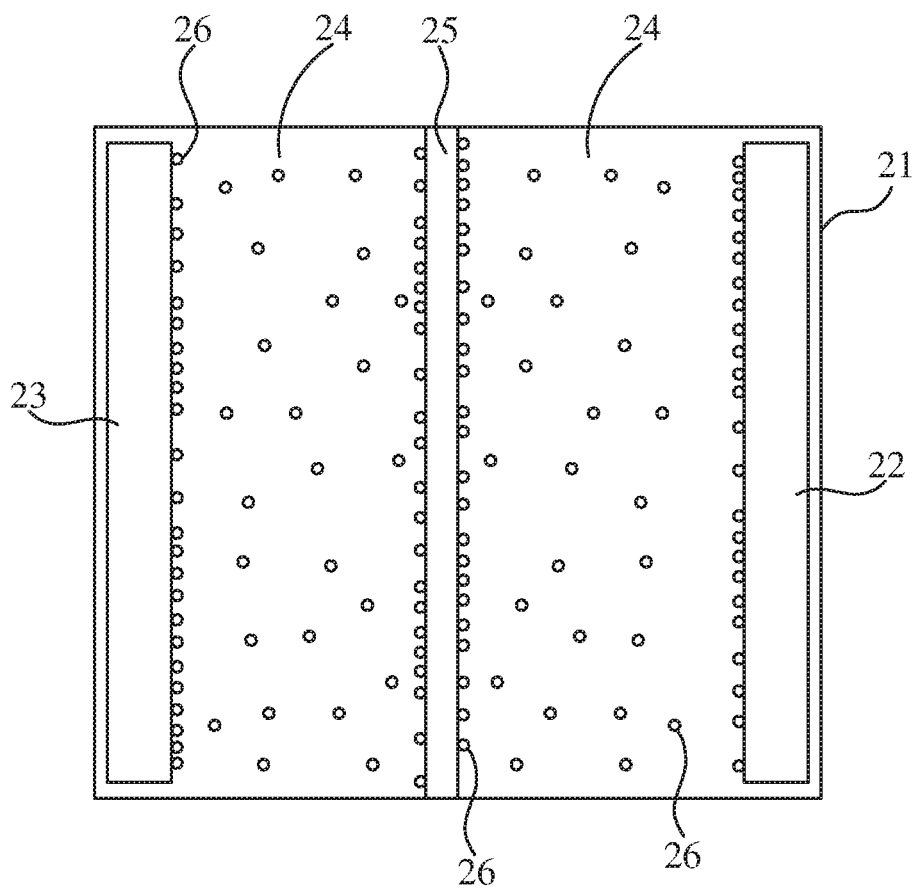
FIG. 2 is a schematic diagram illustrating a lithium battery according to one embodiment of the present disclosure.

Refer to FIG. 2, which is a schematic diagram illustrating a lithium battery 20 according to one embodiment of the present disclosure. The lithium battery 20 includes a hollow housing 21, an anode 22, a cathode 23, a liquid electrolyte 24, a separator 25, and a plurality of GOQDs 26. The hollow housing 21 is mainly used to package the anode 22, the cathode 23, the liquid electrolyte 24, the separator 25, and/or other battery components. In one embodiment, the cathode 23 can be formed of at least one of $LiCoO_2$, ternary materials (such as lithium nickel manganese cobalt oxide ($Li(Ni_xMn_yCo_z)O_2$), where x+y+z=1; $Li(Ni_xMn_yCo_z)O_2$ can be referred to NMC), and $LiFePO_4$. In another embodiment, the anode 22 can be formed of one of graphite, lithium metal, or the like. In a further embodiment, the separator 25 is disposed between the anode 22 and the cathode 23. The separator 25 can be used to avoid a direct electrical contact between the anode 22 and the cathode 23. Further, the separator 25 can ensure that the cations and the anions in the liquid electrolyte 24 can be transferred. In another embodiment, the liquid electrolyte 24 is filled between the anode 22 and the separator 25 and filled between the cathode 23 and the separator 25. In one embodiment, the liquid electrolyte 24 can include a lithium ion composition, such as at least one of $LiPF_6$, $LiClO_4$, $LiSO_4$ and $LiBF_4$. Specifically, the liquid electrolyte 24 can be an electrolyte system which is formed of ethylene carbonate/diethyl carbonate/dimethyl carbonate (EC/DEC/DMC). Further, 1 wt % vinylidene carbonate (VC) and the above lithium ion composition are added into the electrolyte system.

In one embodiment, the GOQDs 26 can be included in at least one of the anode 22, the cathode 23, the liquid electrolyte 24, and the separator 25, so as to improve electrical properties of the lithium battery 20. The principle has been described above, and it will be not repeated here again. In one specific example, the anode 22 includes the GOQDs 26 with a weight percent greater than zero and smaller than or identical to 5% (i.e., for example, 100 grams of the anode 22 includes greater than zero and smaller than or identical to 5 grams of the GOQDs 26). In another specific example, the cathode 23 includes the GOQDs 26 with a weight percent greater than zero and smaller than or identical to 5% (i.e., for example, 100 grams of the cathode 23 includes greater than zero and smaller than or identical to 5 grams of the GOQDs 26). In a further specific example, the separator 25 includes the GOQDs 26 with a weight percent greater than zero and smaller than or identical to 2% (i.e., for example, 100 grams of the separator 25 includes greater than zero and smaller than or identical to 2 grams of the GOQDs 26).

Figure 3:
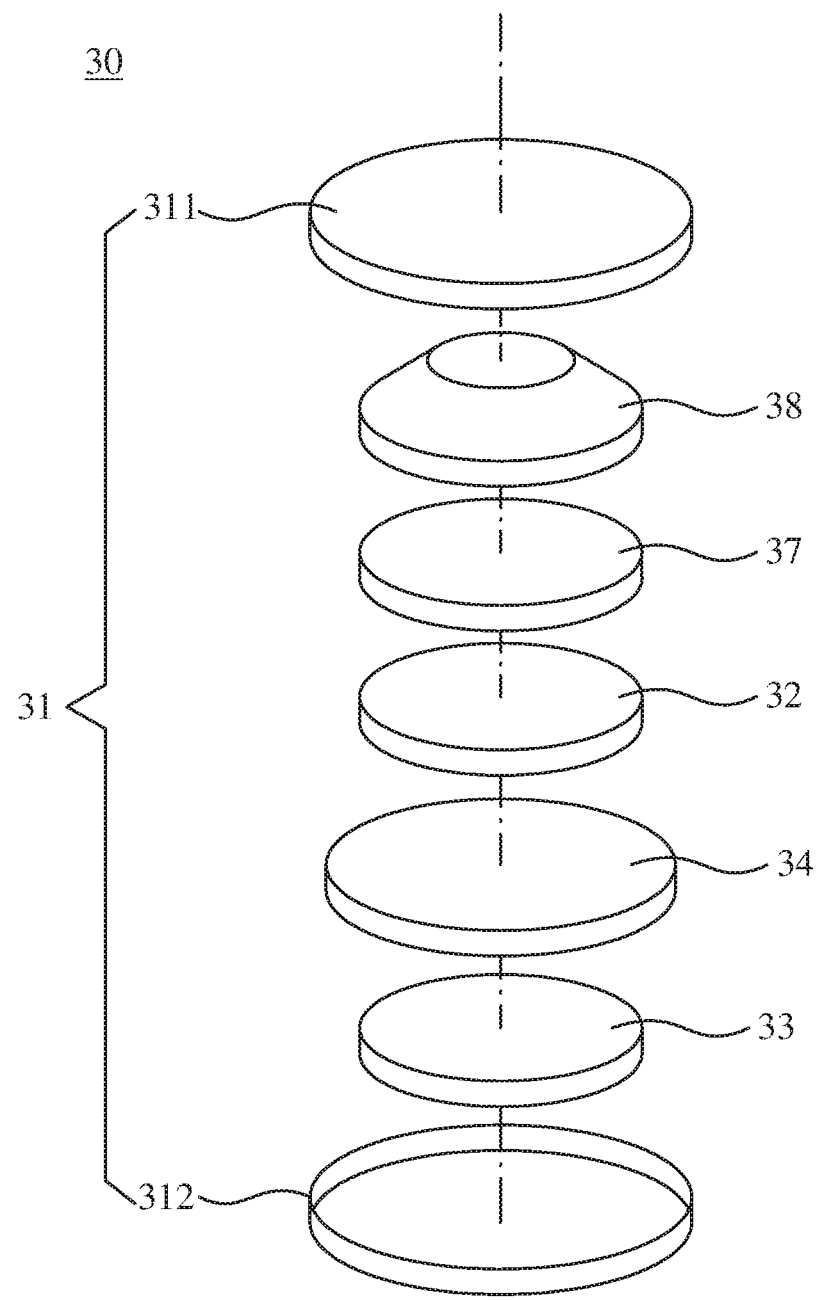
FIG. 3 is a schematic diagram illustrating a lithium battery according to another embodiment of the present disclosure.

Refer to FIG. 3, which is a schematic diagram illustrating a lithium battery 30 according to another embodiment of the present disclosure. In one embodiment, the lithium battery 30 can include a negative case 311, a positive case 312, an anode 32, a cathode 33, and a gel-state electrolyte 34. The negative case 311 and the positive case 312 may constitute a hollow housing 31 used to receive the anode 32, the cathode 33, and the gel-state electrolyte 34. In one embodiment, the cathode 33 can be formed of at least one of $LiCoO_2$, ternary materials (such as NMC), and $LiFePO_4$. In another embodiment, the anode 32 can be formed of one of graphite, lithium metal, or the like. In a further embodiment, for example, the gel-state electrolyte 34 includes: 85 to 95 parts by weight of poly(acrylonitrile-co-vinyl acetate) (PAN-VAC), 7.5 to 12.5 parts by weight of poly(methyl methacrylate) (PMMA), 0.05 to 1 part by weight of the graphene oxide quantum dots, and 20 to 70 parts by weight of a liquid electrolyte, wherein the liquid electrolyte includes a lithium ion composition. A chemical formula of the PAN-VAC can be referred to the following formula (I), wherein x is such as a positive integer being 90-95, and y is such as a positive integer being 5-10.

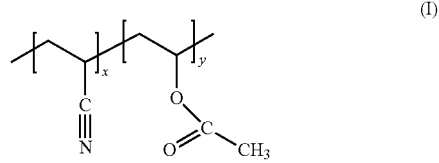

(I)

In a specific example, a method of fabricating the gel-state electrolyte 34 includes steps as follows. For example, 90 parts by weight of PAN-VAC, 10 parts by weight of PMMA, and 0.2 parts by weight of the graphene oxide quantum dots are mixed together to form a precursor, and an electrospinning method is performed on the precursor to form a polymer thin-film. Then, the polymer thin-film is soaked in a liquid electrolyte (such as the liquid electrolyte 24 in FIG. 2) for forming the gel-state electrolyte 34. In one embodiment, the liquid electrolyte soaked by the polymer thin-film ranges from 20 to 70 parts by weight. In detail, the advantage of PAN-VAC includes at least one of high ion dissolution, high chemical stability, thermal stability, promotion of polymer swelling and promotion of ion transmission, etc. Further, the advantage of PMMA includes improvement on the contact of an interface between an electrode and an electrolyte. Therefore, the gel-state electrolyte 34 fabricated by the above material can improve electrical properties of the lithium battery. It is also mentioned that the electrical properties of the lithium battery can be greatly increased by adding the graphene oxide quantum dots with a specific particle size range into the gel-state electrolyte 34. The specific examples can be described later with reference to Embodiments 1 to 2 Comparative examples 1 to 3.

In one embodiment, the graphene oxide quantum dots can also be included in the anode 32 and the cathode 33, which can also improve the electrical properties of the lithium battery. In another embodiment, a specific structure of the lithium battery 30 may further include a spring 38 and a spacer 37. For example, the respective members of the lithium battery 30 are assembled in series with the negative case 311, the spring 38, the cathode 33, the gel-state electrolyte 34, and the anode 32. In another embodiment, the graphene oxide quantum dots can also be included in at least one of the anode 32 and the cathode 33.

One of the advantages of the lithium battery 30 using the gel-state electrolyte 34 is to avoid or decrease a liquid leakage problem induced by the conventional lithium battery using a liquid electrolyte. In another aspect, the lithium battery 30 of one embodiment of the present disclosure has a relatively good electrical property (as opposed to a conventional lithium battery in which the graphene oxide quantum dots are not added) due to the inclusion of the graphene oxide quantum dots.

However, it is to be mentioned that at least one object of the present disclosure is to improve the electrical properties of the lithium battery by adding the graphene oxide quantum dots into the lithium battery. Therefore, no matter what the lithium battery uses the gel-state electrolyte or the liquid electrolyte, the graphene oxide quantum dots can improve the electrical properties of the lithium battery.

Hereinafter, a number of embodiments and a number of comparative examples will be proposed to demonstrate that the graphene oxide quantum dots with a specific average particle size range can improve the electrical properties of the lithium battery.

Embodiment 1

A negative case, a positive case, an anode, a cathode, and a gel-state electrolyte with a plurality of graphene oxide quantum dots are provided. The anode, the cathode, and the gel-state electrolyte are put into a hollow housing formed by the negative case and the positive case, so as to form a lithium battery of embodiment 1. The cathode is formed of $LiFePO_4$, and the anode is formed of Li. Further, a polymer thin-film is formed by the above electrospinning method and then is soaked in a liquid electrolyte, so as to form the gel-state electrolyte. The gel-state electrolyte includes 90 parts by weight of PAN-VAC, 10 parts by weight of PMMA, 0.2 parts by weight of the graphene oxide quantum dots, and 20 parts by weight of liquid electrolyte, wherein the graphene oxide quantum dots have an average particle size of about 7.24 nm.

Embodiment 2

A negative case, a positive case, an anode, a cathode, and a gel-state electrolyte with a plurality of graphene oxide quantum dots are provided. The anode, the cathode, and the gel-state electrolyte are put into a hollow housing formed by the negative case and the positive case, so as to form a lithium battery of embodiment 2. The cathode is formed of $LiFePO_4$, and the anode is formed of Li. Further, a polymer thin-film is formed by the above electrospinning method and then is soaked in a liquid electrolyte, so as to form the gel-state electrolyte. The gel-state electrolyte includes 90 parts by weight of PAN-VAC, 10 parts by weight of PMMA, 0.2 parts by weight of the graphene oxide quantum dots, and 70 parts by weight of liquid electrolyte, wherein the graphene oxide quantum dots have an average particle size of about 2.84 nm.

COMPARATIVE EXAMPLE 1

A hollow housing, an anode, a cathode, a liquid electrolyte, and a separator are provided. The anode, the cathode, the liquid electrolyte, and the separator are put into the hollow housing to form a lithium battery of comparative example 1. The cathode is formed of $LiFePO_4$, the anode is formed of Li, and the liquid electrolyte is an electrolyte system which is formed of ethylene carbonate/diethyl carbonate/dimethyl carbonate (EC/DEC/DMC). Further, 1 wt % vinylidene carbonate (VC) and $LiPF_6$ are added into the electrolyte system.

COMPARATIVE EXAMPLE 2

A negative case, a positive case, an anode, a cathode, and a gel-state electrolyte without a plurality of graphene oxide quantum dots are provided. The anode, the cathode, and the gel-state electrolyte are put into a hollow housing formed by the negative case and the positive case, so as to form a lithium battery of comparative example 2. The cathode is formed of $LiFePO_4$, and the anode is formed of Li. Further, a polymer thin-film is formed by the above electrospinning method and then is soaked in a liquid electrolyte, so as to form the gel-state electrolyte. The gel-state electrolyte includes 90 parts by weight of PAN-VAC, 10 parts by weight of PMMA, 0.2 parts by weight of the graphene oxide quantum dots, and 20 parts by weight of liquid electrolyte.

COMPARATIVE EXAMPLE 3

A negative case, a positive case, an anode, a cathode, and a gel-state electrolyte with a plurality of graphene oxide quantum dots are provided. The anode, the cathode, and the gel-state electrolyte are put into a hollow housing formed by the negative case and the positive case, so as to form a lithium battery of comparative example 3. The cathode is formed of $LiFePO_4$, and the anode is formed of Li. Further, a polymer thin-film is formed by the above electrospinning method and then is soaked in a liquid electrolyte, so as to form the gel-state electrolyte. The gel-state electrolyte includes 90 parts by weight of PAN-VAC, 10 parts by weight of PMMA, 0.2 parts by weight of the graphene oxide quantum dots, and 70 parts by weight of liquid electrolyte, wherein the graphene oxide quantum dots have an average particle size of about 10.77 nm.

The electrical properties of the lithium batteries of embodiments 1 to 2 and comparative examples 1 to 3 will be analyzed below.

First, an ionic conductivity measurement is performed on the lithium batteries of embodiments 1 to 2 and comparative examples 1 to 3, where residual capacitances after discharge at 15 C-rate and battery lives at 500 charge/discharge cycles are measured. The measured results are shown in table 1 below.

TABLE 1

|  | Ionic conductivity (30° C.) (S/cm) | residual capacitance after discharge at 15C-rate (mAh/g) | battery lives at 500 charge/discharge cycles (charge at 1C-rate; discharge at 5C-rate) |
|---|---|---|---|
| Comparative Example 1 | $4.3 \times 10^{-4}$ | 42.2 | 23% |
| Comparative Example 2 | $1.23 \times 10^{-3}$ | 43.2 | 88% |
| Comparative Example 3 | $1.07 \times 10^{-3}$ | 52.9 | 82% |
| Embodiment 1 | $1.42 \times 10^{-3}$ | 54.9 | 100% |
| Embodiment 2 | $1.51 \times 10^{-3}$ | 70.7 | 100% |

From the table 1, when the lithium battery uses the graphene oxide quantum dots with the specific average particle size range, the electrical properties of the lithium battery are improved. For example, compared with comparative examples 1 to 3, the lithium batteries of embodiments 1 and 2 have relatively high ionic conductivities, relatively high residual capacitances, and relatively high battery lives. Further, the principles of improving the effect of the electrical properties of embodiments 1 and 2 have been described above paragraphs and are not repeated herein again.

Figure 4A:
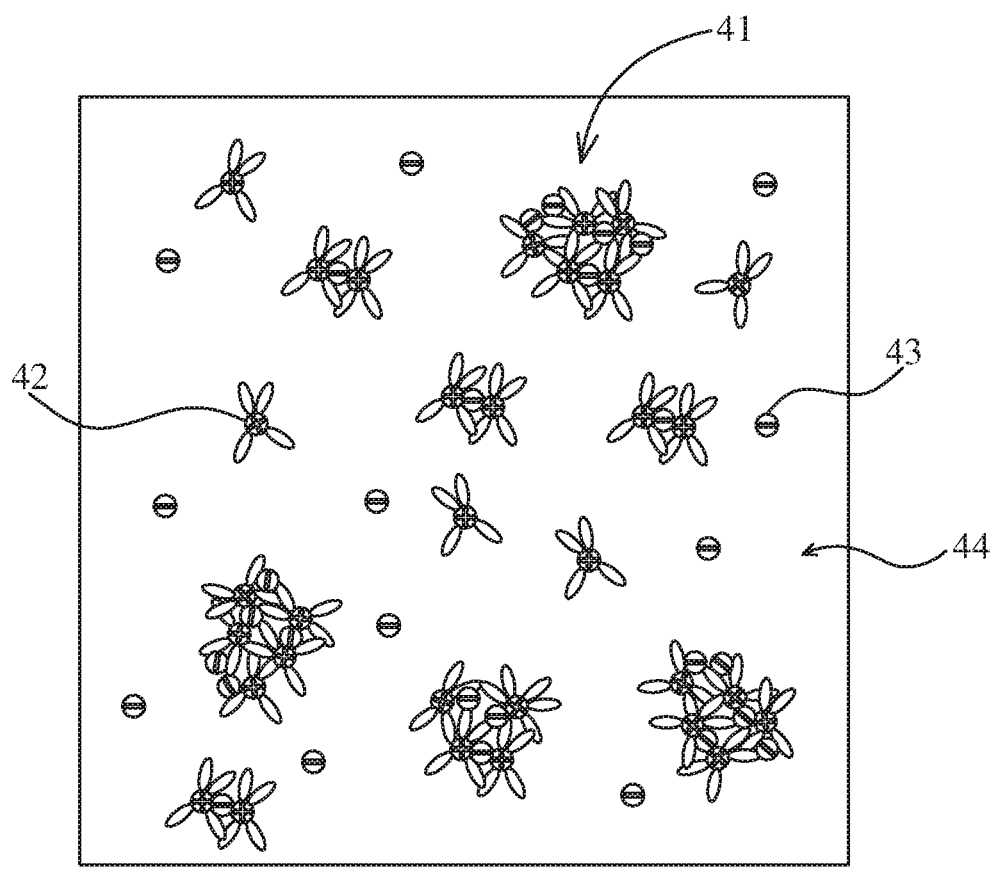
FIG. 4A is a schematic diagram illustrating cations and anions in a liquid electrolyte, where graphene oxide quantum dots are not added into the liquid electrolyte.
Figure 4B:
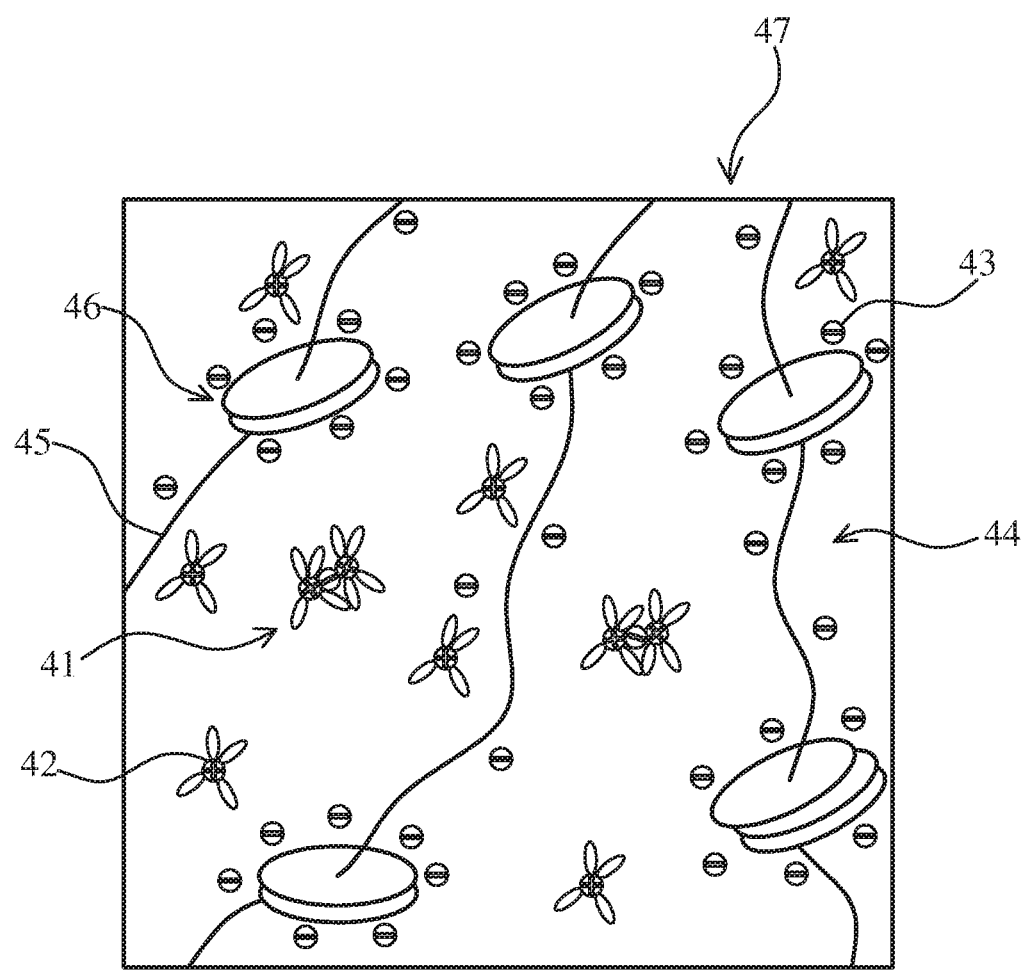
FIG. 4B is a schematic diagram illustrating cations and anions in a gel-state electrolyte, where graphene oxide quantum dots are added into the gel-state electrolyte.

Referring FIG. 4A together with FIG. 4B, FIG. 4A is a schematic diagram illustrating cations 42 and anions 43 in a liquid electrolyte 44, where graphene oxide quantum dots are not added into the liquid electrolyte; and FIG. 4B is a schematic diagram illustrating cations 42 and anions 43 in a gel-state electrolyte 47, where graphene oxide quantum dots 46 are added into the gel-state electrolyte 47. It can be known from FIG. 4A, in the liquid electrolyte 44, the cations 42 easily cluster with the anions 43 to form cluster particles 41, thus resulting in relatively slow charging and/or discharge effects. In another aspect, in one embodiment of the present disclosure, a polymer thin-film is fabricated by the above electrospinning method, where the polymer thin-film has a plurality of polymer chains 45 connected with the graphene oxide quantum dots 46. Then, the polymer thin-film is soaked in a liquid electrolyte 44 for forming the gel-state electrolyte 47. In the gel-state electrolyte 47, the cations 42 and the anions 43 can be shown in FIG. 4B.

Specifically, the anions 43 are attracted or pulled by the graphene oxide quantum dots 46, so that the anions do not move or decrease the movement and cluster particles are relatively few. Therefore, the lithium battery with the graphene oxide quantum dots 46 has improved electrical properties (relative to a conventional lithium battery that no graphene oxide quantum dot 46 is added thereinto).

The present disclosure has been described with a preferred embodiment thereof and it is understood that many changes and modifications to the described embodiment can be carried out without departing from the scope and the spirit of the disclosure that is intended to be limited only by the appended claims.

The invention claimed is:

1. A lithium battery, comprising:
   a hollow housing;
   an anode disposed in the hollow housing;
   a cathode disposed in the hollow housing;
   a separator disposed between the anode and the cathode;
   a liquid electrolyte filled between the anode and the separator and filled between the cathode and the separator, wherein the liquid electrolyte comprises a lithium ion composition; and
   a plurality of graphene oxide quantum dots, wherein the graphene oxide quantum dots have an average particle size between 2 nm and 9 nm, wherein the liquid electrolyte or the separator comprises the graphene oxide quantum dots.

2. The lithium battery according to claim 1, wherein the anode comprises the graphene oxide quantum dots.

3. The lithium battery according to claim 1, wherein the cathode comprises the graphene oxide quantum dots.

4. A lithium battery, comprising:
   a hollow housing;
   an anode disposed into hollow housing;
   a cathode disposed in the hollow housing;
   a gel-state electrolyte disposed between the anode and the cathode; and
   a plurality of graphene oxide quantum dots, wherein the graphene oxide quantum dots have an average particle size between 2 nm and 9 nm, wherein the gel-state electrolyte comprises the graphene oxide quantum dots.

5. The lithium battery according to claim 4, wherein the gel electrolyte comprises:
   85 to 95 parts by weight of poly(acrylonitrile-co-vinyl acetate);
   7.5 to 12.5 parts by weight of poly(methyl methacrylate);
   0.05 to 1 part by weight of the graphene oxide quantum dots; and
   20 to 70 parts by weight of a liquid electrolyte, wherein the liquid electrolyte comprises a lithium ion composition.

* * * * *